(12) United States Patent
Shimizu et al.

(10) Patent No.: US 11,161,474 B2
(45) Date of Patent: Nov. 2, 2021

(54) AIR-BAG APPARATUS

(71) Applicant: HONDA MOTOR CO., LTD., Tokyo (JP)

(72) Inventors: Takayuki Shimizu, Wako (JP); Hiroyuki Ito, Wako (JP); Takashi Saso, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 8 days.

(21) Appl. No.: 16/809,619

(22) Filed: Mar. 5, 2020

(65) Prior Publication Data
US 2020/0290547 A1 Sep. 17, 2020

(30) Foreign Application Priority Data
Mar. 12, 2019 (JP) .............................. JP2019-045097

(51) Int. Cl.
| | |
|---|---|
| *B60R 21/231* | (2011.01) |
| *B60R 21/207* | (2006.01) |
| *B60R 21/2334* | (2011.01) |
| *B60R 21/2338* | (2011.01) |
| *B60R 21/015* | (2006.01) |

(Continued)

(52) U.S. Cl.
CPC ...... *B60R 21/207* (2013.01); *B60R 21/01512* (2014.10); *B60R 21/2165* (2013.01); *B60R 21/231* (2013.01); *B60R 21/2334* (2013.01); *B60R 21/2338* (2013.01); *B60R 2021/0048* (2013.01); *B60R 2021/0058* (2013.01); *B60R 2021/01006* (2013.01); *B60R 2021/01225* (2013.01); *B60R 2021/01238* (2013.01);

(Continued)

(58) Field of Classification Search
CPC ............ B60R 21/231; B60R 21/01552; B60R 21/015; B60R 21/207; B60R 21/20; B60R 21/2334; B60R 21/2338; B60R 2021/161; B60R 2021/01238; B60R 2021/2074; B60R 2021/0048; B60R 2021/23107; B60R 2021/23382; B60R 2021/23384; B60R 2021/23386; B60R 2021/23388; B60R 2021/0044; B60R 2021/0004; B60R 2021/0058; B60R 2021/0032; B60R 2021/26058; B60R 2021/01211; B60R 2021/01225; B60N 2/427; B60N 2/0232; B60N 2/02; B60N 2/22; B60N 2/68; B60N 2/42745
USPC .................................. 280/730.1, 728.1, 753
See application file for complete search history.

(56) References Cited

U.S. PATENT DOCUMENTS

2011/0148081 A1\* 6/2011 Smith ..................... B60R 21/18
280/733

FOREIGN PATENT DOCUMENTS

JP 2017-140924 8/2017

\* cited by examiner

*Primary Examiner* — Keith J Frisby
(74) *Attorney, Agent, or Firm* — Amin, Turocy & Watson, LLP

(57) ABSTRACT

An air-bag apparatus includes: a bag body that is provided on a vehicle seat and that is inflated and expanded at a time of an impact input and prevents at least an upper part of a body of an occupant seated on the vehicle seat from being separated from a seat back of the vehicle seat; an inflator that supplies a gas to the bag body at a time of an impact input; a body size detection part that detects a body size of the occupant seated on the vehicle seat; and an expansion degree adjustment part that adjusts a degree of an inflation expan- (Continued)

sion of the bag body in accordance with the body size of the occupant detected by the body size detection part.

7 Claims, 3 Drawing Sheets

(51) Int. Cl.
*B60R 21/2165* (2011.01)
*B60R 21/01* (2006.01)
*B60R 21/00* (2006.01)
*B60R 21/26* (2011.01)

(52) U.S. Cl.
CPC ............... *B60R 2021/23384* (2013.01); *B60R 2021/26058* (2013.01)

AIR-BAG APPARATUS

CROSS-REFERENCE TO RELATED APPLICATION

Priority is claimed on Japanese Patent Application No. 2019-045097, filed on Mar. 12, 2019, the contents of which are incorporated herein by reference.

BACKGROUND

Field of the Invention

The present invention relates to an air-bag apparatus.

Background

In the related art, an air-bag apparatus is known which expands a bag body when an impact is input to a vehicle.

Such an air-bag apparatus receives part of a body of an occupant by a bag body which is inflated and expanded and thereby protects the body of the occupant.

For example, Japanese Unexamined Patent Application, First Publication No. 2017-140924 discloses a configuration including an air-bag main body which is accommodated in an upper part of a vehicle seat and is configured as a single bag body that is inflated and expanded upon supply of a gas, is expanded to a region including the front of a head part of an occupant and a region including both right and left sides, and covers the head part.

SUMMARY

An occupant seated on a vehicle seat varies in body size. The occupant seated on the vehicle seat may be, for example, a child or a small occupant having a low height. The occupant seated on the vehicle seat may be, for example, a large occupant such as a sumo wrestler.

On the other hand, the size of the bag body inflated and expanded from the vehicle seat is the same, and with respect to a small occupant, there may be cases in which, for example, a gap is formed between the bag body and the body of the occupant, and the body of the occupant cannot be received by the bag body. With respect to the large occupant, there may be cases in which the body of the occupant cannot be covered by the bag body.

An object of an aspect of the present invention is to provide an air-bag apparatus capable of sufficiently receiving a body of an occupant with respect to occupants of various body sizes.

An air-bag apparatus according to a first aspect of the present invention includes: a bag body that is provided on a vehicle seat and that is inflated and expanded at a time of an impact input and prevents a body of an occupant seated on the vehicle seat from being separated from a seat back of the vehicle seat; an inflator that supplies a gas to the bag body at a time of an impact input; a body size detection part that detects a body size of the occupant seated on the vehicle seat; and an expansion degree adjustment part that adjusts a degree of an inflation expansion of the bag body in accordance with the body size of the occupant detected by the body size detection part.

A second aspect is the air-bag apparatus according to the first aspect, wherein the bag body may have a volume change part that changes a volume of the bag body, and the expansion degree adjustment part may adjust the degree of the inflation expansion of the bag body by changing the volume of the bag body using the volume change part.

A third aspect is the air-bag apparatus according to the second aspect, wherein the volume change part may be provided at a rearward position of the occupant seated on the vehicle seat.

A fourth aspect is the air-bag apparatus according to any one of the first to third aspects, wherein the expansion degree adjustment part may adjust the volume of the bag body by adjusting an amount of the gas filled into the bag body from the inflator.

A fifth aspect is the air-bag apparatus according to the fourth aspect, wherein the gas may be supplied into the bag body from a first number of inflators when the body size of the occupant detected by the body size detection part is smaller than a predetermined criterion, and the gas may be supplied into the bag body from a second number of inflators, the second number being more than the first number, when the body size of the occupant detected by the body size detection part is equal to or larger than the predetermined criterion.

A sixth aspect is the air-bag apparatus according to any one of the first to fifth aspects, wherein the expansion degree adjustment part may adjust the degree of the inflation expansion of the bag body by breaking a sewn part that is provided on the bag body and sews the bag body or a tether having a band shape and provided on the bag body in a case where a pressure of the gas filled into the bag body from the inflator exceeds a predetermined reference value.

A seventh aspect is the air-bag apparatus according to any one of the first to sixth aspects, wherein the bag body may include a pair of front extension parts each of which extends frontward from each of both sides in a width direction of the seat back, and a front bag that is provided continuously to the front extension part, that is expanded to a frontward side of the occupant seated on the vehicle seat, and that comes into contact with an upper part of the body of the occupant.

An eighth aspect is the air-bag apparatus according to the seventh aspect, wherein each of the pair of front extension parts may be expanded to each of both sides in a width direction of the vehicle seat so as to interpose a head part of the occupant and may be arranged along a front surface and a side surface of the head part.

According to the first aspect, the expansion degree adjustment part adjusts the degree (size) of the inflation expansion of the bag body in accordance with the body size of the occupant detected by the body size detection part, and thereby, it is possible to sufficiently receive the body of the occupant with respect to occupants of various body sizes.

According to the second aspect, in the expansion degree adjustment part, the degree of the inflation expansion of the bag body is adjusted by changing the volume of the bag body using the volume change part. Thereby, it is possible to sufficiently receive the body of the occupant with respect to occupants of various body sizes.

According to the third aspect, the volume change part is provided at a rearward position of the occupant seated on the vehicle seat. Thereby, with respect to a portion of the bag body for preventing at least an upper part of the body of the occupant from being separated from the seat back of the vehicle seat, no change occurs in a contact condition with the occupant or the like. Thereby, it is possible to reliably reduce the amount of frontward movement of the body of the occupant.

According to the fourth aspect, the volume of the bag body is adjusted by adjusting the amount of the gas filled from the inflator, and thereby, the degree of the inflation expansion of the bag body is adjusted in accordance with occupants of various body sizes.

According to the fifth aspect, when the body size of the occupant is small, by decreasing the gas supplied into the bag body, the degree of the inflation expansion of the bag body is decreased. When the body size of the occupant is large, by increasing the gas supplied into the bag body, the degree of the inflation expansion of the bag body is increased. Thereby, it is possible to sufficiently receive the body of the occupant with respect to occupants of various body sizes.

According to the sixth aspect, in a case where the pressure of the gas is increased to the reference value or more, the sewn part or the tether is broken, and thereby, the bag body can be inflated and expanded larger.

According to the seventh aspect, the front bag that is provided continuously to the pair of front extension parts each of which extends in a vehicle frontward direction from each of both sides in the width direction of the seat back is expanded to a vehicle frontward side of the occupant seated on the vehicle seat. Thereby, it is possible to reduce the amount of frontward movement of the body of the occupant.

According to the eighth aspect, the pair of front extension parts are arranged along the front surface and the side surface of the head part of the occupant, and thereby, it is possible to reduce the amount of frontward movement of the head part of the occupant. Thereby, it is possible to prevent the head part of the occupant from hitting an in-vehicle constituent member or the like that is provided in the frontward direction.

DESCRIPTION OF EMBODIMENTS

Figure 1:
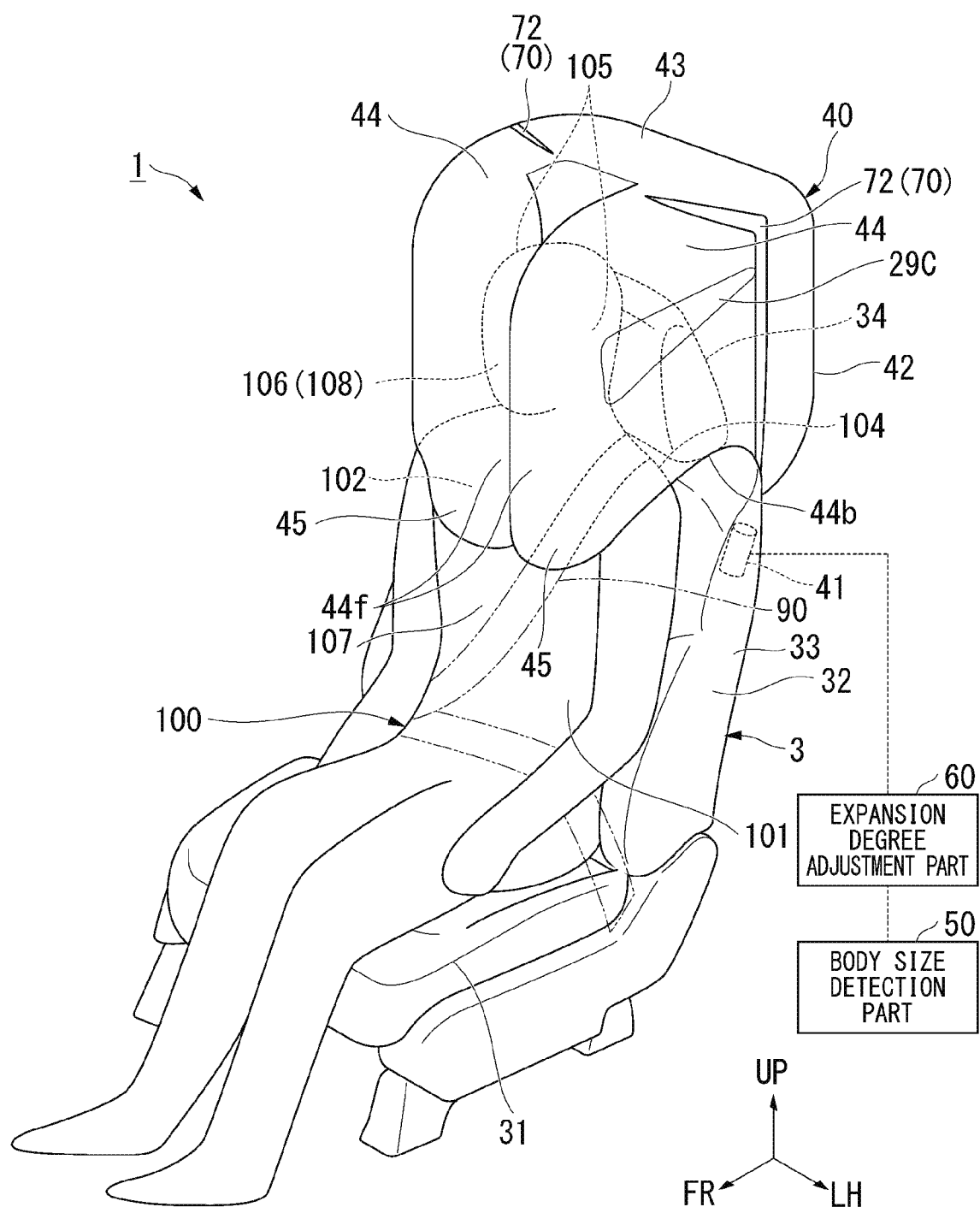
FIG. 1 is a view showing a vehicle seat in which an air-bag apparatus according to an embodiment of the present invention is mounted and is a perspective view showing a state in which the air-bag apparatus is expanded.

Hereinafter, an embodiment of the present invention will be described with reference to the drawings. In the drawings used below, an arrow FR indicates a frontward direction of a vehicle, an arrow UP indicates an upward direction of the vehicle, and an arrow LH indicates a leftward direction of the vehicle.

Figure 2:
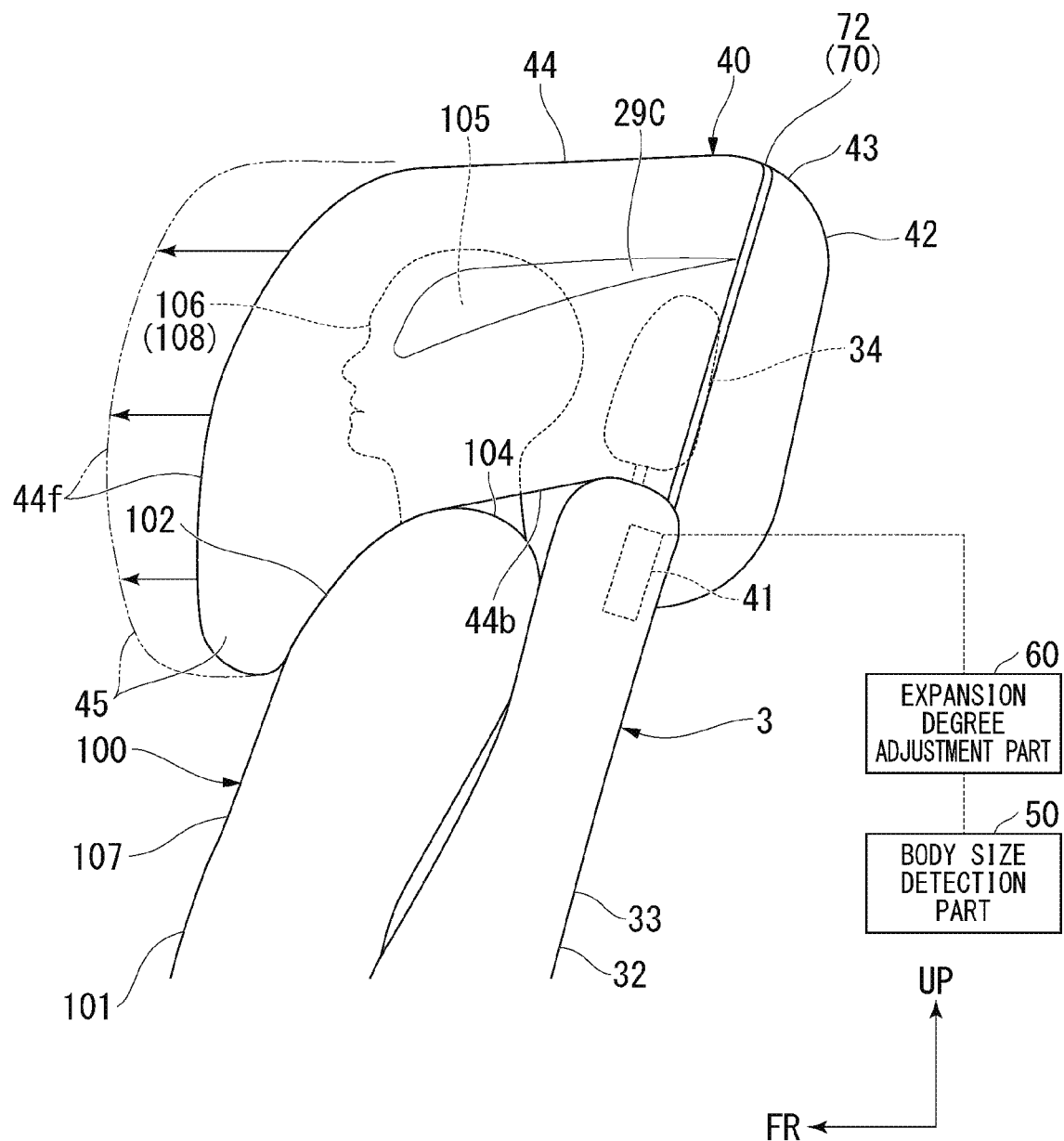
FIG. 2 is a side view showing a state in which the air-bag apparatus is expanded.

FIG. 1 is a view showing a vehicle seat in which an air-bag apparatus according to an embodiment of the present invention is mounted and is a perspective view showing a state in which the air-bag apparatus is expanded. FIG. 2 is a side view showing a state in which the air-bag apparatus is expanded.

As shown in FIG. 1 and FIG. 2, a vehicle 1 includes a vehicle seat 3 including an air-bag apparatus 40 inside a vehicle room.

The vehicle seat 3 is provided as, for example, a driver's seat, a passenger seat, a rear seat, or the like.

The vehicle seat 3 includes a seat cushion 31 that supports buttocks of an occupant and a seat back 32 that is connected to a rear end part of the seat cushion 31 and that supports an upper body (a body, a neck part, and a head part) of the occupant.

The seat cushion 31 includes a frame (not shown) that forms a skeleton of the seat cushion 31, a pad material (not shown) that is formed of, for example, a urethane foam or the like and that is mounted on the frame, and a cover (not shown) that is formed of, for example, a synthetic fiber, leather, or the like and that covers the frame and the pad material. The seat cushion 31 is fixed to a floor surface inside the vehicle room of the vehicle 1.

The seat back 32 includes a seat back main body 33 that stands upward from a rear end part of the seat cushion 31 and that supports a body 101 (for example, a waist part and a back part) of an occupant 100 and a head rest 34 that is attached to an upper end part of the seat back main body 33 and that supports, for example, a head part 108 of the occupant 100. The seat back 32 is formed of a frame, a pad material, and a cover similarly to the seat cushion 31. The seat back main body 33 and the head rest 34 may be integrally formed.

The seat back 32 is connected to a rear end part of the seat cushion 31 to be tiltable around a reclining shaft (not shown) that extends in a right-to-left direction. A tilt angle of the tiltable seat back 32 can be held to a plurality of stages by a locking portion (not shown) that includes a pin or the like.

A specific configuration for tilting the seat back 32 may be arbitrary as long as a required function can be realized.

As shown in FIG. 1 and FIG. 2, the air-bag apparatus 40 holds an upper part of the upper body of the occupant at the time of operation. The air-bag apparatus 40 includes an inflator 41 (refer to FIG. 2), a bag body 42, a body size detection part 50, and an expansion degree adjustment part 60.

The inflator 41 generates high-pressure gas at the time of an impact input to the vehicle. The inflator 41 is embedded in the vehicle seat 3. The inflator 41 supplies the gas into the bag body 42. In the present embodiment, a plurality of (for example, two) inflators 41 are provided.

The bag body 42 is accommodated inside the vehicle seat 3, for example, in a folded state or a wound state and is inflated and expanded from the vehicle seat 3 upon supply of the gas from the inflator 41. The bag body 42 is formed of a single base fabric or a plurality of base fabrics sewn together in a sack shape. The following description regarding the bag body 42 describes a state in which the expansion of the bag body 42 has been completed unless otherwise stated.

The bag body 42 is expanded from the inside of the vehicle seat 3 through a prescribed opening or the like. The bag body 42 includes a rear bag 43, a pair of front extension parts 44, and a pair of front bags 45.

The rear bag 43 stands further upward than an upper end of the head rest 34. The rear bag 43 is formed such that a width size in the right-to-left direction is larger than a width size of the head rest 34.

Each of the pair of front extension parts 44 extends frontward from each of both sides in the width direction of the rear bag 43. The pair of front extension parts 44 is provided such that a spacing in the right-to-left direction is gradually decreased toward the frontward direction. That is, each of the front extension parts 44 extends obliquely frontward so as to approach a center side in the width direction of the seat back main body 33 from a side in the width direction of the rear bag 43. Thereby, the bag body 42 defines a substantially triangular shape in plan view. Front end parts 44f of the pair of front extension parts 44 may be connected to each other.

The pair of front extension parts 44 expand so as to cover a front surface 106 and a side surface 105 of the head part 108 of the occupant 100. A lower end part 44b of the front extension part 44 expands so as to cover an upper surface of a shoulder part 104 of the body 101 of the occupant 100.

The pair of front bags 45 are provided to extend downward from the front end parts 44f of the pair of front extension parts 44. The front bag 45 is formed continuously to a lower side of the front end part 44f of the front extension part 44. The front bag 45 communicates with the front extension part 44. The front bag 45 expands to a frontward side of the occupant 100 seated on the vehicle seat 3 and comes into contact with only an upper part 102 of a front surface of the body 101 of the occupant 100. Specifically, the front bag 45 is provided to come into contact with a clavicle of the body 101 and a plurality of ribs from the top of the rib (for example, from a top rib to a second rib). A lower part of the front bag 45 terminates, for example, at a height of a second rib from the above and does not come into contact with a region (a lower part 107 of the front surface of the body 101) of third and subsequent ribs from the above. Thereby, the strength of the force for holding the occupant is relatively changed in the vertical direction of the front bag 45.

A tether (not shown) having a band shape is provided inside the bag body 42 such that the rear bag 43, the front extension part 44, and the front bag 45 are expanded as described above.

A non-expansion part 29C that is formed of the opposing base fabrics of the bag body sewn together such that the non-expansion part 29C does not inflate at the time of expansion is formed on the front extension part 44. By forming the non-expansion part 29C, the front extension part 44 expands in an annular shape so as to surround the non-expansion part 29C.

The inflator 41 supplies the gas in the bag body 42 inside the rear bag 43. The bag body 42 is provided such that the rear bag 43, the front extension part 44, and the front bag 45 are inflated and expanded in this order when the gas is supplied from the inflator 41.

The bag body 42 includes a volume change part 70 that changes the volume of the bag body 42. The volume change part 70 is provided at a rearward position of the occupant 100 seated on the vehicle seat 3. Specifically, the volume change part 70 is provided between the rear bag 43 and the front extension part 44 or on a rear part of the front extension part 44. For example, a sewn part 72 sewn in a state where part of the bag body 42 is folded can be provided as the volume change part 70.

The sewn part 72 maintains a non-inflated state in which part of the bag body 42 is folded when the pressure of the gas supplied from the inflator 41 to the bag body 42 is less than a predetermined reference value. The sewn part 72 is broken when the pressure of the gas supplied from the inflator 41 to the bag body 42 becomes equal to or more than the predetermined reference value and allows part of the bag body 42 to be expandable from the folded state. Thereby, as shown by a two-dot chain line in FIG. 2, a front part of the bag body 42 is significantly inflated and expanded frontward, the length in the front-to-rear direction of the bag body 42 is increased, and the volume inside the bag body 42 is increased. At this time, the inflation expansion of the bag body 42 is controlled by the tether or the like such that the inflation expansion of the rear part of the bag body 42 is not significantly changed.

The body size detection part 50 detects the body size of the occupant 100 seated on the vehicle seat 3. The body size detection part 50 includes, for example, a seat belt sensor (not shown) that detects the length of a seat belt 90 hung on the body of the occupant 100. The seat belt sensor is provided on a belt roller (not shown) around which the seat belt 90 is wound. The seat belt sensor detects a rotation number of the belt roller and thereby detects a seat belt unwound amount which is an amount of the seat belt unwound by the occupant 100 and hung on the body. A detection signal of the seat belt sensor is output to the expansion degree adjustment part 60.

A camera that images the body of the occupant 100 may be used as the body size detection part 50. An image captured by the camera is output to the expansion degree adjustment part 60.

A controller that controls an operation of the air-bag apparatus 40 includes functionally the expansion degree adjustment part 60. The expansion degree adjustment part 60 adjusts the degree (size) of the inflation expansion of the bag body 42 in accordance with the body size of the occupant 100 detected by the body size detection part 50. The expansion degree adjustment part 60 adjusts the degree of the inflation expansion of the bag body 42 by changing the volume of the bag body 42 using the volume change part 70. By adjusting the amount of the gas filled from the inflator 41 into the bag body 42, the expansion degree adjustment part 60 adjusts the volume of the bag body 42 and adjusts the degree of the inflation expansion of the bag body 42.

The expansion degree adjustment part 60 supplies the gas into the bag body 42 from one (a first number) inflator 41 when the body size (seat belt unwound amount) of the occupant 100 detected by the body size detection part 50 is less than a predetermined criterion. The expansion degree adjustment part 60 supplies the gas into the bag body 42 from two (a second number more than the first number) inflators 41 when the body size (seat belt unwound amount) of the occupant 100 detected by the body size detection part 50 is equal to or larger than the predetermined criterion.

A sewn strength of the sewn part 72 is set such that the sewn part 72 is broken in a case where the pressure of the gas filled into the bag body 42 from the inflator 41 exceeds a predetermined reference value.

Hereinafter, the operation of the air-bag apparatus 40 will be described.

First, when the occupant 100 is seated on the vehicle seat 3 and wears the seat belt 90, the seat belt sensor of the body size detection part 50 detects the seat belt unwound amount of the seat belt unwound by the occupant 100 and hung on the body. The detection signal at the body size detection part 50 is output to the expansion degree adjustment part 60.

The expansion degree adjustment part 60 receives the detection signal output from the body size detection part 50. The expansion degree adjustment part 60 determines whether or not the seat belt unwound amount is equal to or larger than a predetermined criterion on the basis of the received detection signal. As a result, if the seat belt unwound amount is equal to or larger than the predetermined criterion, then it is determined that the occupant 100 seated on the vehicle seat 3 is large, if the seat belt unwound amount is smaller than the predetermined criterion, then it is determined that the occupant 100 seated on the vehicle seat 3 is small, and the determination result is stored.

When an impact is input to the vehicle, the inflator 41 of the air-bag apparatus 40 generates high-pressure gas. When the gas is generated from the inflator 41, the rear bag 43 is inflated and expanded first upon supply of the gas. When the rear bag 43 is inflated and expanded, the gas is supplied from both sides in the width direction of the rear bag 43 to the pair of front extension parts 44, and the pair of front extension parts 44 are inflated and expanded. Then, the gas is supplied to the front bag 45 from the pair of front extension parts 44. Thereby, the front bag 45 is inflated and expanded in front of the upper part 102 of the body 101 of the occupant 100.

When the inflator 41 generates the high-pressure gas, in a case where the stored body size of the occupant 100 is small, the expansion degree adjustment part 60 generates the high-pressure gas using only one inflator 41. In a case where the stored body size of the occupant 100 is large, the expansion degree adjustment part 60 generates the high-pressure gas using two inflators 41.

When the gas is generated from the inflator 41, the bag body 42 is inflated and expanded upon supply of the gas. At this time, in a case where the gas is generated from only the one inflator 41, the sewn part 72 is not broken. On the other hand, in a case where the body size of the occupant 100 is large, and the gas is generated using the two inflators 41, the bag body 42 is inflated and expanded by the generated gas. In a case where the bag body 42 is inflated and expanded using the two inflators 41, the pressure in the bag body 42 becomes higher than the case where the bag body 42 is inflated and expanded using only the one inflator 41. When the pressure inside the bag body 42 exceeds a predetermined reference value, the sewn part 72 is broken, part of the bag body 42 is expanded from the folded state, the length in the front-to-rear direction of the bag body 42 is increased, and the volume inside the bag body 42 is increased. Thereby, the inflated and expanded bag body 42 becomes a size corresponding to the large occupant 100.

Accordingly, the operation of the air-bag apparatus 40 is completed.

As described above, in the above embodiment, the expansion degree adjustment part 60 adjusts the degree (size) of the inflation expansion of the bag body 42 in accordance with the body size of the occupant 100 detected by the body size detection part 50, and thereby, it is possible to sufficiently receive the body of the occupant 100 with respect to occupants 100 of various body sizes.

Further, in the expansion degree adjustment part 60, the degree of the inflation expansion of the bag body 42 is adjusted by changing the volume of the bag body 42 using the volume change part 70. Thereby, it is possible to sufficiently receive the body of the occupant 100 with respect to occupants 100 of various body sizes.

Further, the volume change part 70 is provided at a rearward position of the occupant 100 seated on the vehicle seat 3. Thereby, with respect to a portion of the bag body 42 that comes into contact with the upper part 102 of the body 101 of the occupant 100 so as to prevent at least the upper part 102 of the body 101 of the occupant 100 from being separated from the seat back 32 of the vehicle seat 3, no change occurs in a contact condition with the occupant 100 or the like. Thereby, it is possible to reliably reduce the amount of frontward movement of the body 101 of the occupant 100.

Further, the volume of the bag body 42 is adjusted by adjusting the amount of the gas filled from the inflator 41, and thereby, it is possible to sufficiently receive the body of the occupant 100 with respect to occupants 100 of various body sizes.

Further, in a case where the body size of the occupant 100 is small, by decreasing the gas supplied into the bag body 42, the bag body 42 is expanded to be in a small size. In a case where the body size of the occupant 100 is large, by increasing the gas supplied into the bag body 42, the bag body 42 is expanded to be in a large size. Thereby, it is possible to sufficiently receive the body of the occupant 100 with respect to occupants 100 of various body sizes.

Further, in a case where the pressure of the gas is increased to the reference value or more, the sewn part 72 is broken, and thereby, the bag body 42 can be inflated and expanded to be in a larger size.

Further, the front bag 45 that is provided continuously to the pair of front extension parts 44 each of which extends frontward from each of both sides in the width direction of the seat back 32 expands to the frontward side of the occupant 100 seated on the vehicle seat 3. Thereby, it is possible to reduce the amount of a frontward movement of the body 101 of the occupant 100. Further, the front bag 45 comes into contact with the upper part 102 on the front surface of the body 101 of the occupant 100. The upper part 102 of the body 101 of the occupant 100, that is, for example, the clavicle or a part, for example, from the top of the rib to several ribs is resistant to a load applied from the front as compared to a lower part than the several ribs. Since the front bag 45 comes into contact with the upper part 102 of the body 101 which is resistant to the load as described above, it is possible to mitigate the impact which is received by the occupant 100 even if the body 101 of the occupant 100 is displaced to swing frontward and hits the bag body 42 at the time of collision.

Further, the pair of front extension parts 44 are arranged along the front surface 106 and the side surface 105 of the head part 108 of the occupant 100, and thereby, it is possible to reduce the amount of frontward movement of the head part 108 of the occupant 100. Thereby, it is possible to prevent the head part 108 of the occupant 100 from hitting an in-vehicle constituent member or the like that is provided in the frontward direction.

MODIFIED EXAMPLE OF EMBODIMENT

Figure 3:
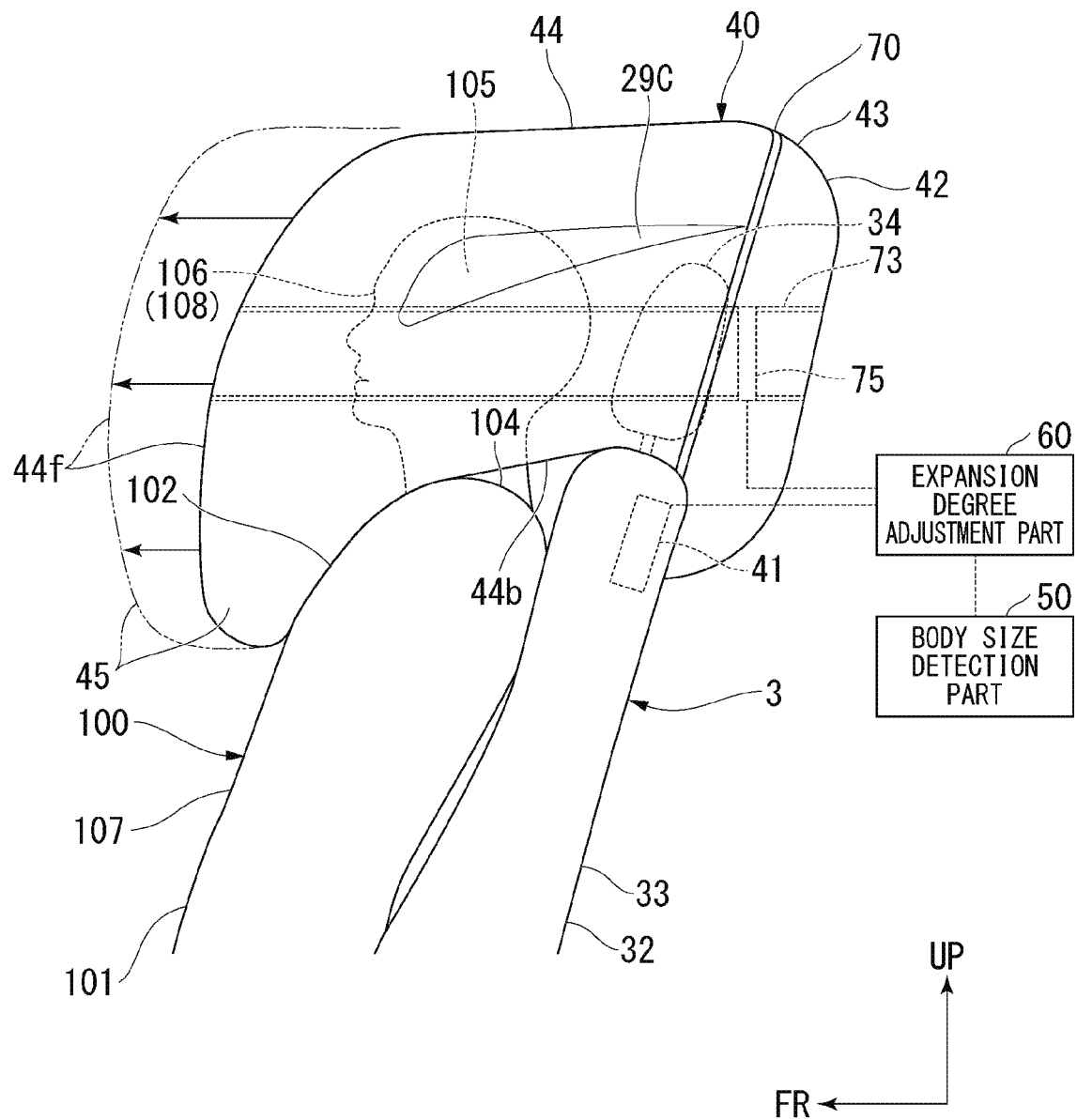
FIG. 3 is a view showing a vehicle seat in which an air-bag apparatus according to a modified example of the present embodiment is mounted and is a side view showing a state in which the air-bag apparatus is expanded.

FIG. 3 is a view showing a vehicle seat in which an air-bag apparatus according to a modified example of the present embodiment is mounted and is a side view showing a state in which the air-bag apparatus is expanded.

As shown in FIG. 3, a tether 73 that has a band shape and that regulates the length in the front-to-rear direction of the front extension part 44 of the bag body 42 may be provided as the volume change part 70. The tether 73 regulates the length in the front-to-rear direction of the front extension part 44 in a state where the front extension part 44 is shortened in the front-to-rear direction. The tether 73 is broken, for example, in a case where the pressure of the gas supplied from the inflator 41 to the bag body 42 becomes equal to or more than a predetermined reference value. The tether 73 may be broken by a cut part 75, such as a tether cutter, which operates on the basis of a command from the expansion degree adjustment part 60, which will be described later. When the tether 73 is broken, the regulation of the length in the front-to-rear direction of the bag body 42 is released, the bag body 42 is lengthened in the front-to-rear direction, and the volume inside the bag body 42 is also increased.

The expansion degree adjustment part 60 may break the tether 73 having a band shape and provided on the bag body 42 in a case where the pressure of the gas filled from the inflator 41 into the bag body 42 exceeds the predetermined reference value. The cut part 75 is provided in order to cut the tether 73. The cut part 75 cuts the tether 73 by exploding an explosive in a case where the pressure of the gas filled from the inflator 41 into the bag body 42 exceeds the predetermined reference value.

The expansion degree adjustment part 60 may break the tether 73 by the cut part 75 in a case where the body size (seat belt unwound amount) of the occupant 100 detected by the body size detection part 50 is equal to or more than a predetermined criterion.

According to such a configuration, in a case where the pressure of the gas becomes equal to or higher than the reference value, the tether 73 is broken, and thereby, the bag body 42 can be inflated and expanded to a larger extent. In this way, by adjusting the degree of the inflation expansion of the bag body 42, it is possible to sufficiently receive the body of the occupant 100 with respect to occupants 100 of various body sizes.

Further, in a case where the pressure of the gas filled from the inflator 41 into the bag body 42 exceeds the predetermined reference value, the bag body 42 can be inflated and expanded to be in a larger size by cutting the tether 73 at the cut part 75.

The present invention is not limited to the above embodiment described with reference to the drawings, and various modified examples can be conceivable within the technical scope of the invention.

For example, in the above embodiment, the air-bag apparatus 40 includes the rear bag 43, the pair of front extension parts 44, and the front bag 45; however, as long as the occupant 100 can be effectively protected, the shape and configuration of the air-bag apparatus 40 can be appropriately changed.

The configurations in the above embodiment are examples of the present invention and can be variously changed without departing from the scope of the present invention.

What is claimed is:

1. An air-bag apparatus, comprising:
   a bag body that is provided on a seat back of a vehicle seat and that is inflated and expanded at a time of an impact input;
   an inflator that supplies a gas to the bag body at a time of an impact input;
   a body size detection part that detects a body size of an occupant seated on the vehicle seat; and
   an expansion degree adjustment part that adjusts a degree of an inflation expansion of the bag body in accordance with the body size of the occupant detected by the body size detection part,
   wherein the bag body comprises: a rear bag that is located at a further rear position than the seat back; a pair of front extension parts each of which extends frontward continuously from each of both sides in a width direction of the rear bag; and
   a pair of front bags that extend downward continuously from a front end portion of the pair of front extension parts,
   a sewn part is provided between the rear bag and the pair of front extension parts, and
   the expansion degree adjustment part adjusts the degree of the inflation expansion of the bag body by changing a volume of the bag body using the sewn part.

2. The air-bag apparatus according to claim 1,
   wherein a volume change part is provided at a rearward position of the occupant seated on the vehicle seat.

3. The air-bag apparatus according to claim 1,
   wherein the expansion degree adjustment part adjusts the volume of the bag body by adjusting an amount of the gas filled into the bag body from the inflator.

4. The air-bag apparatus according to claim 3,
   wherein the gas is supplied into the bag body from a first number of inflators when the body size of the occupant detected by the body size detection part is smaller than a predetermined criterion, and
   the gas is supplied into the bag body from a second number of inflators, the second number being more than the first number, when the body size of the occupant detected by the body size detection part is equal to or larger than the predetermined criterion.

5. The air-bag apparatus according to claim 1,
   wherein the expansion degree adjustment part adjusts the degree of the inflation expansion of the bag body by breaking a sewn part that is provided on the bag body and sews the bag body or a tether having a band shape and provided on the bag body in a case where a pressure of the gas filled into the bag body from the inflator exceeds a predetermined reference value.

6. The air-bag apparatus according to claim 1,
   wherein each of the pair of front extension parts is capable of extending frontward from each of both sides in a width direction of the seat back and being expanded to a frontward side of the occupant seated on the vehicle seat, and
   the front bag is capable of coming into contact with an upper part of the body of the occupant.

7. The air-bag apparatus according to claim 6,
   wherein each of the pair of front extension parts is capable of being expanded to each of both sides in a width direction of the vehicle seat so as to interpose a head part of the occupant.

\* \* \* \* \*